(12) United States Patent
Löfqvist et al.

(10) Patent No.: US 10,315,225 B2
(45) Date of Patent: Jun. 11, 2019

(54) DRUM, A MACHINE COMPRISING SUCH DRUM, AND A METHOD FOR DRUM AND MANUFACTURING OF SUCH DRUM

(71) Applicant: BOMILL AB, Lund (SE)

(72) Inventors: Bo Löfqvist, Lund (SE); Peter Larsson, Sjöbo (SE)

(73) Assignee: BOMILL AB, Lund (SE)

( * ) Notice: Subject to any disclaimer, the term of this patent is extended or adjusted under 35 U.S.C. 154(b) by 0 days.

(21) Appl. No.: 14/914,287

(22) PCT Filed: Aug. 28, 2014

(86) PCT No.: PCT/SE2014/050988
§ 371 (c)(1),
(2) Date: Feb. 25, 2016

(87) PCT Pub. No.: WO2015/030665
PCT Pub. Date: Mar. 5, 2015

(65) Prior Publication Data
US 2016/0199883 A1    Jul. 14, 2016

(30) Foreign Application Priority Data
Aug. 29, 2013    (SE) ...................................... 1351001

(51) Int. Cl.
*B07B 13/02*    (2006.01)
*B07B 1/46*    (2006.01)
(Continued)

(52) U.S. Cl.
CPC ........ *B07B 1/4618* (2013.01); *B01D 33/0012* (2013.01); *B01D 33/0016* (2013.01);
(Continued)

(58) Field of Classification Search
CPC ............ B01D 33/0012; B01D 33/0016; B01D 33/073; B01D 33/275; B01D 33/466;
(Continued)

(56) References Cited

U.S. PATENT DOCUMENTS 2,478,246 A    8/1949 Cortese et al.
4,805,668 A *  2/1989 Genter .................... B60T 11/26
                                                    137/558

(Continued)

FOREIGN PATENT DOCUMENTS

AT    19449 B       3/1905
CN    87208730 U    1/1988
(Continued)

OTHER PUBLICATIONS

International Search Report and Written Opinion dated Dec. 16, 2014 for international application PCT/SE2014/050988, filed on Aug. 8, 2014 and published as WO 2015/030665 (Applicant—Bomill AB // Inventor—Lofqvist, et al.) (9 pages).
(Continued)

*Primary Examiner* — Jeffrey A Shapiro
(74) *Attorney, Agent, or Firm* — Ballard Spahr LLP

(57) ABSTRACT

A drum (100) for sorting objects is provided. The drum has a cylindrical shape, and said drum (100) comprises a cylindrical body (101), with an inner and an outer envelope surface. A plurality of pockets (104) are arranged on the inner envelope surface of the cylindrical body (101), and said pockets (104) are provided with openings (105) opening up into the outer envelope surface. At least one groove (106) is arranged on the outer envelope surface, said groove (105) interconnecting at least two openings (105). A machine (1000) comprising such a drum (100) and a method for manufacturing such drum (100) are also provided.

11 Claims, 4 Drawing Sheets

(51) Int. Cl.
  *B23P 11/02* (2006.01)
  *B01D 33/00* (2006.01)
  *B01D 33/073* (2006.01)
  *B01D 33/27* (2006.01)
  *B07B 1/22* (2006.01)
  *B07B 13/04* (2006.01)
  *B07B 1/18* (2006.01)
  *B07B 1/52* (2006.01)

(52) U.S. Cl.
  CPC ......... *B01D 33/073* (2013.01); *B01D 33/275* (2013.01); *B07B 1/22* (2013.01); *B07B 13/02* (2013.01); *B07B 13/04* (2013.01); *B23P 11/025* (2013.01); *B07B 1/18* (2013.01); *B07B 1/522* (2013.01); *B07B 1/526* (2013.01); *B07B 2230/01* (2013.01)

(58) Field of Classification Search
  CPC ......... B07B 2230/01; B07B 1/18; B07B 1/06; B07B 1/22; B07B 13/02; B07B 1/4618; D21D 5/06; D21D 5/026; D21D 5/08
  USPC ....... 209/270, 283–306, 406, 407, 473, 482, 209/44.3, 683, 684, 686–688, 44.2, 542, 209/576, 577, 588, 590, 644, 915
  See application file for complete search history.

(56) References Cited

U.S. PATENT DOCUMENTS

| | | | | |
|---|---|---|---|---|
| 5,022,806 | A * | 6/1991 | Lonardi | F27B 1/20 239/659 |
| 5,259,512 | A * | 11/1993 | Czerwoniak | B01D 29/31 209/273 |
| 5,384,046 | A * | 1/1995 | Lotter | D21D 5/16 209/397 |
| 5,415,294 | A * | 5/1995 | Nagaoka | B01D 29/012 209/393 |
| 5,472,095 | A * | 12/1995 | Malm | B01D 29/13 209/303 |
| 5,624,558 | A * | 4/1997 | Aaltonen | B01D 29/356 209/250 |
| 5,699,724 | A | 12/1997 | Wettstein et al. | |
| 6,029,825 | A * | 2/2000 | Pfeffer | D21D 5/026 162/55 |
| 6,079,284 | A | 6/2000 | Yamamoto et al. | |
| 6,096,991 | A | 8/2000 | Stone et al. | |
| 6,131,743 | A * | 10/2000 | Czerwoniak | B01D 29/111 209/405 |
| 6,216,877 | B1 * | 4/2001 | Lindstrom | D21D 5/16 209/273 |
| 6,244,446 | B1 * | 6/2001 | Schmittel | B03B 5/00 209/132 |
| 6,257,413 | B1 * | 7/2001 | Tolvanen | D21D 5/16 209/363 |
| 6,479,789 | B1 * | 11/2002 | Rundqvist | B01D 33/067 219/121.72 |
| 6,789,681 | B2 * | 9/2004 | Czerwoniak | B07B 1/18 209/405 |
| 7,964,065 | B2 * | 6/2011 | Niiranen | D21D 5/16 162/251 |
| 2001/0032816 | A1 * | 10/2001 | Mickelat | D21D 5/16 210/445 |
| 2002/0189994 | A1 * | 12/2002 | Czerwoniak | B07B 1/18 210/497.01 |
| 2004/0112827 | A1 * | 6/2004 | May | B01D 29/111 210/497.01 |
| 2006/0180533 | A1 * | 8/2006 | Cummins | A01K 63/00 210/167.22 |
| 2007/0240843 | A1 * | 10/2007 | Niiranen | D21D 5/16 162/289 |
| 2009/0020461 | A1 * | 1/2009 | Hetu | B01D 29/111 209/406 |
| 2011/0284430 | A1 * | 11/2011 | Hamelin | B07B 1/20 209/235 |
| 2013/0105368 | A1 * | 5/2013 | Azzolin | B07B 1/005 209/235 |

FOREIGN PATENT DOCUMENTS

| | | |
|---|---|---|
| CN | 2936456 Y | 8/2007 |
| EP | 1578544 A1 | 9/2005 |
| WO | WO-99/42223 A1 | 8/1999 |
| WO | WO 2004/060585 | 7/2004 |
| WO | WO 2013/062057 A1 | 5/2013 |

OTHER PUBLICATIONS

Supplementary European Search Report and Written Opinion dated Mar. 30, 2017 by the European Patent Office for EP Application No. 14839056, which was filed on Aug. 28, 2014 and published as 3038765 on Jul. 6, 2016 (Applicant—Bomill AB) (8 pages).

International Preliminary Report on Patentability dated Dec. 16, 2014 by the International Searching Authority for International Application No. PCT/SE2014/050988, which was filed on Aug. 28, 2014 and published as WO 2015/030665 on Mar. 5, 2015 (Applicant—Bomill AB) (5 pages).

\* cited by examiner

DRUM, A MACHINE COMPRISING SUCH DRUM, AND A METHOD FOR DRUM AND MANUFACTURING OF SUCH DRUM

CROSS-REFERENCE TO RELATED APPLICATIONS

This Application is a U.S. National Phase Application of International Application No. PCT/SE2014/050988, filed Aug. 28, 2014, which claims the benefit of Swedish Application No. 1351001-1, filed Aug. 29, 2013, which are both incorporated herein by reference in their entirety.

FIELD OF THE INVENTION

The present invention concerns a machine for sorting objects, within a bulk of objects, as well as a drum or cylinder being a part of such a machine. More particularly, the present invention pertains to a drum in form of a cylinder for a machine for sorting objects within a bulk of objects, said drum having inner cylindrical surface and an outer cylindrical surface, said inner cylindrical surface being provided with pockets for receiving an object each, and said pockets being provided with an opening into said outer cylindrical surface.

BACKGROUND OF THE INVENTION

It is known to sort objects within a bulk of objects, such as grains, by means of a rotating cylinder or drum, which cylinder has pockets on the inside. This cylinder is rotating around a substantially horizontal axis, while being aligned with its longitudinal central axis coinciding with said horizontal axis. The objects, such as granules, are feed into one end of the cylinder, and as the cylinder rotates the granules will be lifted as they are captured in the pockets. The pockets are adapted in size and dimensions for receiving one object each. In the bottom of each pocket an opening is provided into the outside surface of the drum, such that for example light may be sent outside the drum, through the openings, onto the objects, and being detected on the inside of the drum or reflected to be detected on the outside of the drum, or vice versa. In this way the object in the respective pocket may be illuminated with light, and reflection or transmission spectra may be obtained. From this spectra, characteristics of said objects may be obtained, which may be used to sort or fractionize said bulk of objects based on said characteristics. One or several collectors may then be placed in the vicinity of the drum, to receive—after characterization—a specified fraction based on impulses from a detector. A drum of this kind, and a machine comprising such drum, is disclosed in WO 2004/060585.

A problem associated with such a drum is that the opening may be occluded by the objects received therein, if the objects get stuck in the opening. Then this pocket will be useless for the rest of the fractionizing procedure, since the object being stuck not will be expelled into its corresponding through and no new object can enter the pocket during the next revolution of the drum. As the fractionizing procedure continues the problem increases as more and more openings get occluded by objects.

SUMMARY OF THE INVENTION

Accordingly, the present invention preferably seeks to mitigate, alleviate or eliminate one or more of the above-identified deficiencies in the art and disadvantages singly or in any combination and solves at least the above mentioned problems by providing a drum for sorting objects, and a machine for sorting objects comprising such a drum, said drum having a cylindrical shape, and said drum comprising: a cylindrical body, with an inner and an outer envelope surface; a plurality of pockets arranged on the inner envelope surface of the cylindrical body, said pockets being provided with openings opening up into the outer envelope surface; and at least one groove, arranged on the outer envelope surface, said groove interconnecting at least two openings. A method for manufacturing such a drum is also provided.

Further advantageous embodiments of the present invention are embodied in the appended patent claims.

BRIEF DESCRIPTION OF THE DRAWINGS

These and other aspects, features and advantages of which the invention is capable of will be apparent and elucidated from the following description of embodiments of the present invention, reference being made to the accompanying drawings, in which.

DESCRIPTION OF EMBODIMENTS

The following description focuses on embodiments of machines for sorting objects, within a bulk of objects, as well as a drum or cylinder being a part of such a machine. More particularly, the present invention pertains to a drum in form of a cylinder for a machine for sorting objects within a bulk of objects, said drum having inner cylindrical surface and an outer cylindrical surface, said inner cylindrical surface being provided with pockets for receiving an object each, and said pockets being provided with an opening into said outer cylindrical surface. Such object may for example be a granule of an organic material, such as grains or seeds, but it is also conceivable that the object is a pharmaceutical pill, a bean, a plastic granule or the like, as long as an emitted wave length may be absorbed or reflected in a way to obtain a spectrophotometric profile of the object.

Figure 1:
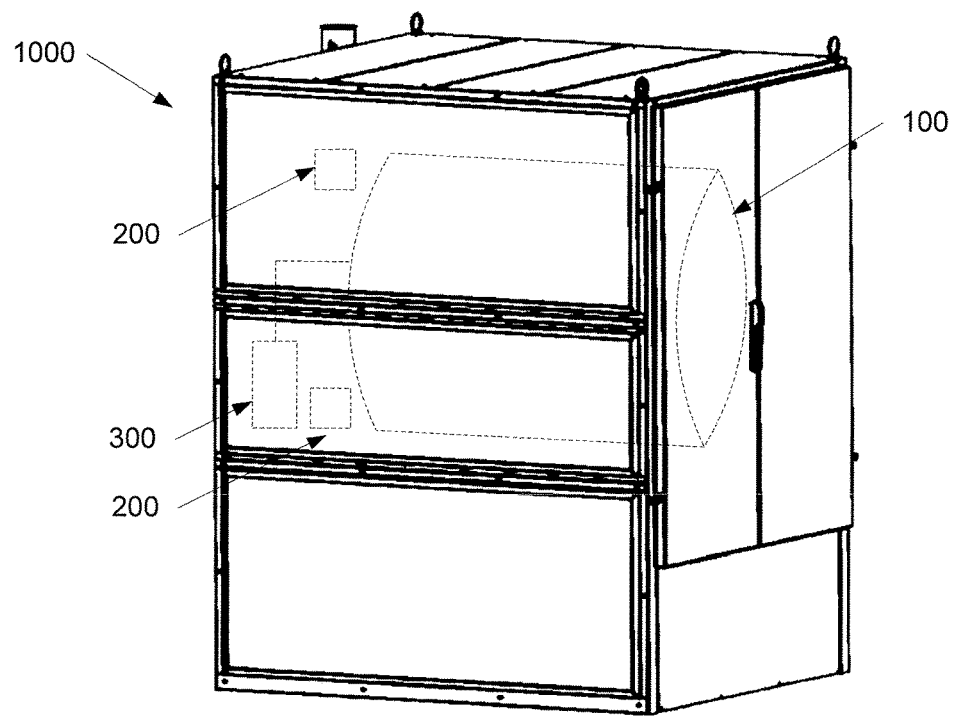
FIG. 1 is a perspective view of a sorting machine according to one embodiment of the present invention.
Figure 2:
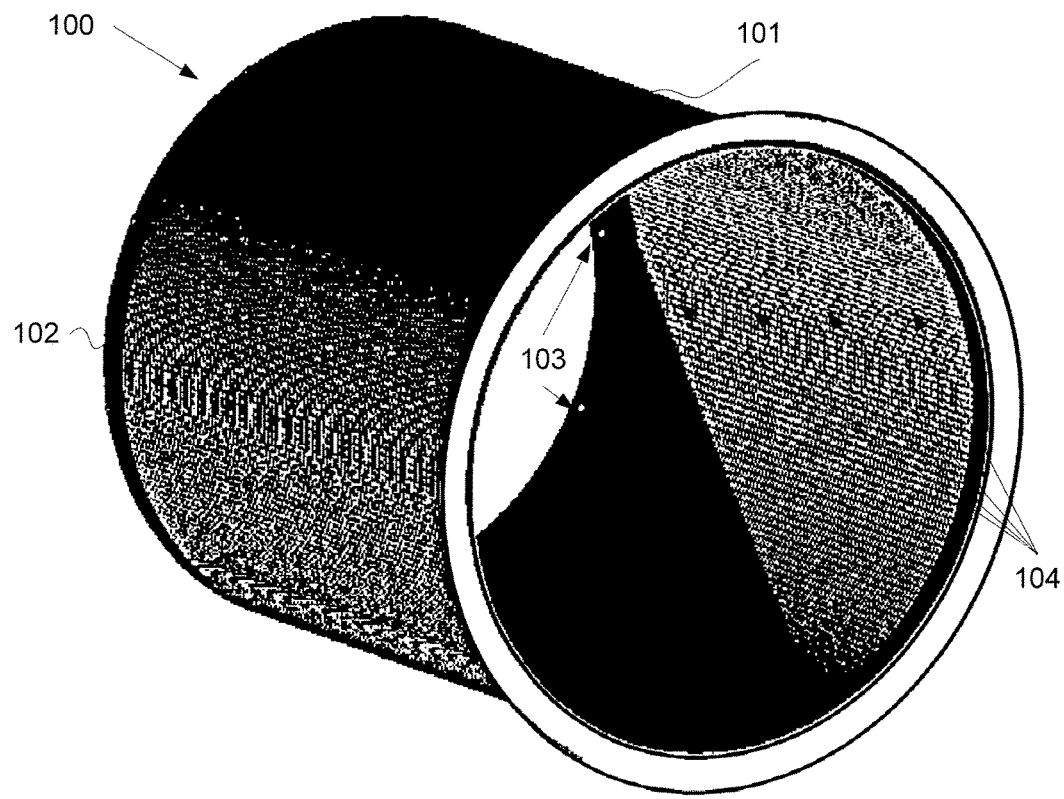
FIG. 2 is a perspective view of a drum according to one embodiment of the present invention.

FIG. 1 discloses a perspective view of a machine 1000 for sorting objects. The machine 1000 comprises a drum 100 (shown with broken line), located within the machine 1000. The drum 100 comprises a cylinder shaped body 101, with a first and a second axial end, as disclosed in FIGS. 2 and 3. The drum 100 is arranged in the machine 1000 on a suitable support structure 200 (shown with broken line), and is connected to a suitable driving means 300 (shown with broken line). The driving means 300 may for example be an electrical motor.

The drum 100 has a longitudinal extension from 20 mm to 1500 mm, such as 500 to 1250 mm, and the diameter of the drum is in the interval from 0.5 to 2 meters, such as 0.75 to 1.5 meters. The drum is suitably manufactured in steel, such as mild or stainless steel.

The drum 100 is arranged in the machine 1000 to rotate, by the driving force of the driving means 300, around its central and longitudinal axis. For this reason the drum 100 is suspended on the machine 1000 and connected to the driving means 300 via a suspension flange 102 at the second axial end of the drum 100, in accordance with FIG. 2.

Figure 4:
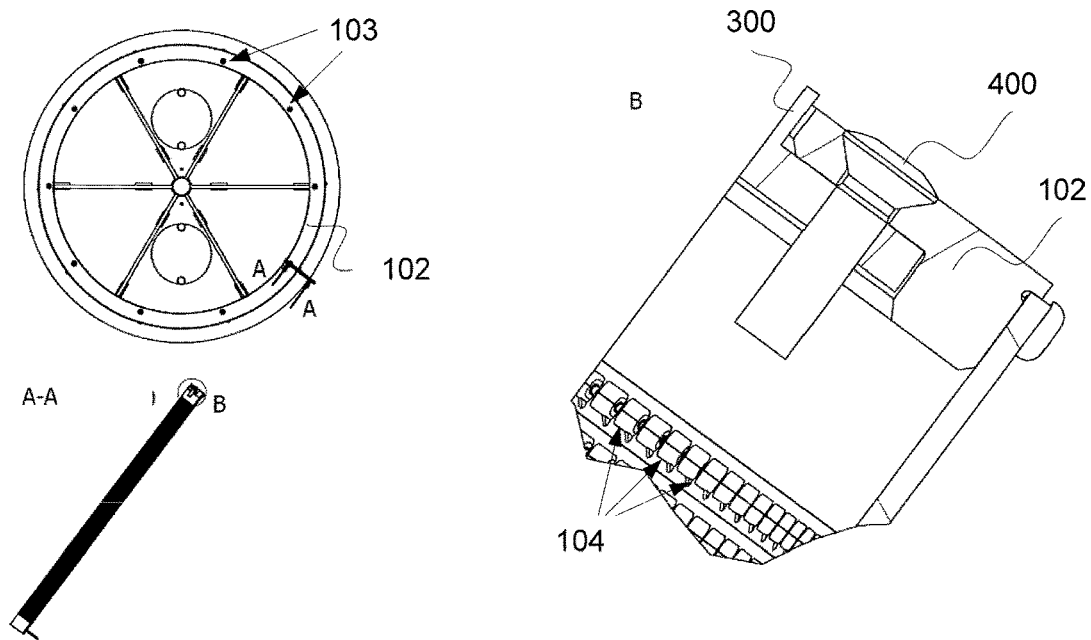
FIG. 4 is a front view of a drum as well as a cross-section of a suspension flange and a driving means also with a close up of these, according to one embodiment of the present invention.
Figure 6:
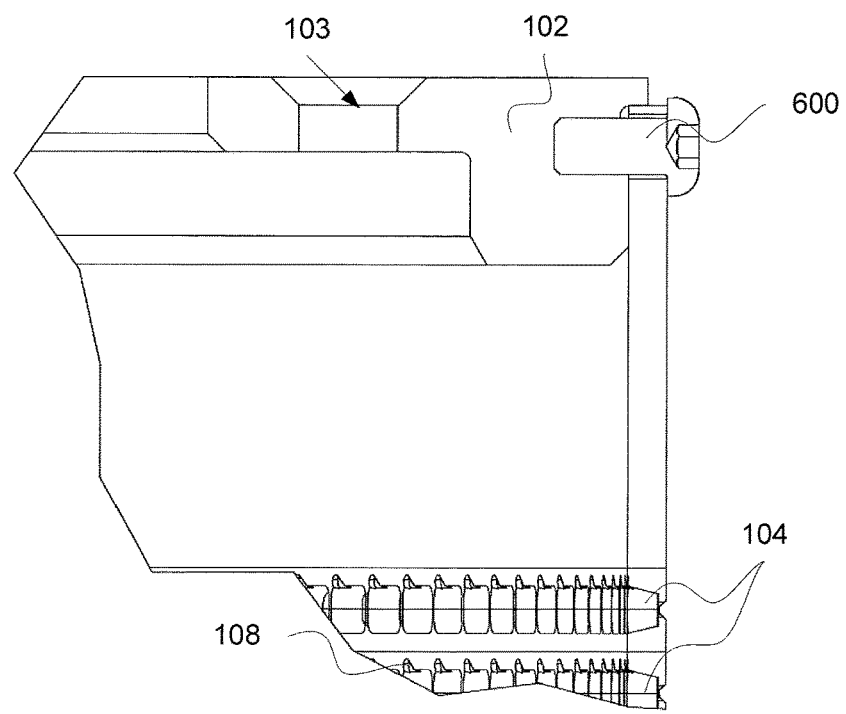
FIG. 6 is a close up of a cross sectional view of the second axial end of a drum, according to one embodiment of the present invention.

The suspension flange 102 extends centrally from the second axial end of the body 101, in accordance with FIGS. 4 and 6. Also, the suspension flange 102 extends in a plane transversal to the central axis of the drum 100. The suspension flange 102 is provided with apertures 103 for receiving bolts 400 there through in a drum suspending manner. The suspension flange 102 may be fixed to the cylindrical drum 100 via bolts or screws 600. The apertures 103 are preferably arranged at a uniform distance from each other, to ensure good load distribution between the driving means 300 and the drum 100. Preferably, the number of apertures 103 is selected in the interval from 4 to 16, such as 6 to 12, such as 6, 7, 8, 9, or 10. At the second end surface of the suspension flange 102, the edge of the apertures 103 are slanting laterally in relation to the central axis of the aperture 103 towards the second end surface of the suspension flange 102. This slanting helps self alignment of the drum 100, and facilitates tensioning of the bolts 400. The suspension flange 102 may for example be welded to the second axial end of the drum 100, or the inner or outer periphery of the second axial end of the drum 100. An arrangement of a suspension flange 102 in accordance with the embodiments above, allow for an even load distribution, allowing for maintained drum position in the machine 1000 during rotation with or without the bulk of objects.

At the inner cylindrical surface of the body 101, i.e. the inner envelope surface, the drum 100 is provided with pockets 104. The pockets 104 are arranged in a number of columns, extending radially on the inner envelope surface of the drum 100. The pockets 104 may be oval or round in shape, seen from above, depending on the shape of the objects to be sorted. The pockets 104 may have a width of 2 to 10 mm, such as 3 to 7 mm, and a length of 2 to 20 mm, such as 5 to 15 mm, depending on the size of the objects to be sorted. Each pocket 104 is provided with an opening 105 at the bottom of the pocket 104. The opening 105 opens up into the outside surface of the drum 100, i.e. the outer envelope surface, such that for example light may be sent outside the drum, through the opening 105, onto objects being situated in the pocket 104, and being detected on the inside of the drum 100 or reflected to be detected on the outside of the drum 100, or vice versa, i.e. that the detection is performed outside the drum and the radiation source is arranged within the drum. In this way the object in the respective pocket 104 may be illuminated with light, and reflection or transmission signals, such as spectra, may be obtained.

Figure 5:
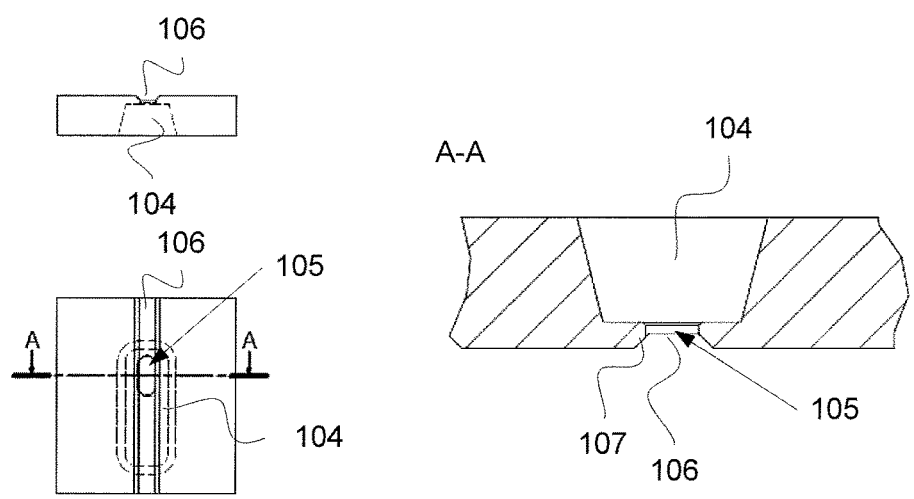
FIG. 5 is a top view and cross-sectional views of a pocket in a drum, according to one embodiment of the present invention.

At the outer cylindrical surface, i.e. the outer envelop surface, of the body 101, the drum 100 is provided with grooves 106, in accordance with FIG. 5. The grooves 106 are arranged to coincide with openings 105 of a column of pockets 104. As such the grooves 106 are arranged to extend transversally to the central and longitudinal axis of the drum 100. This means that the grooves 106 are arranged radially on the outer envelope surface of the body 101. In this way, a cleaning brush or a blade (not shown) may be arranged on the outer peripheral side of the drum 100, such that straws or the like on the brush or blade edge may run continuously in the grooves 106, to evacuate objects stuck in the openings 105. This will result in improved capacity maintenance of the machine 1000, since the number of free pockets after each drum rotation may be increased. Due to these grooves 106 the thickness of the drum wall may be kept high enough to make sure that the drum 100 may be spun around its central axis without distortion of shape, which would inevitably result drum wobbling, resulting in uneven load distribution increasing wear on the machine 1000 and jeopardizing sorting ability. Also, the grooves 106 aids brush on brushes to work against the openings instead of being pushed away by the object in the openings or simply fall off to the sides. The grooves 106 have slanting side surfaces 107. The slanting side surfaces 107 are slanting laterally and upwardly in relation to the grooves 106. In this way the risk of jamming a cleaning blade, running in the groove 106 is decreased, which ensures smooth machine operation as well as low machine part wear as well as drum wear. Also, it will be easier for objects released by the aid of the brush or blade to be removed from the groove 106.

Also the pockets 104 of each column are normally placed at a short distance from each other, such as 0.5 to 10 mm, such as 1 to 5 mm, depending on the objects to be sorted. Additionally, the distance between each column is short, such as 1 to 20 mm, such as 5 to 15 mm, depending on the objects to be sorted. The number of columns varies but is often between 1 and 1000, such as 50 to 500. The number of columns and the number of pockets 104 per column are dictated by a number of factors such as the size, quantity and filling performance of objects to be sorted, the number of detectors, energy sources and ejecting means used, available space, desired capacity etc. The columns may be displaced in relation to each other, such that two pockets 104 in adjacent columns do not line up. In this way, the distance between the columns may be shortened. Additionally, the average friction coefficient between the columns is increased. Another way to moderate friction is to provide the pockets 104 with for example an ear 108, extending laterally from the pocket 104. This ear 108 may be a small cavity, formed simultaneously with the pocket 104, during milling thereof.

Figure 3:
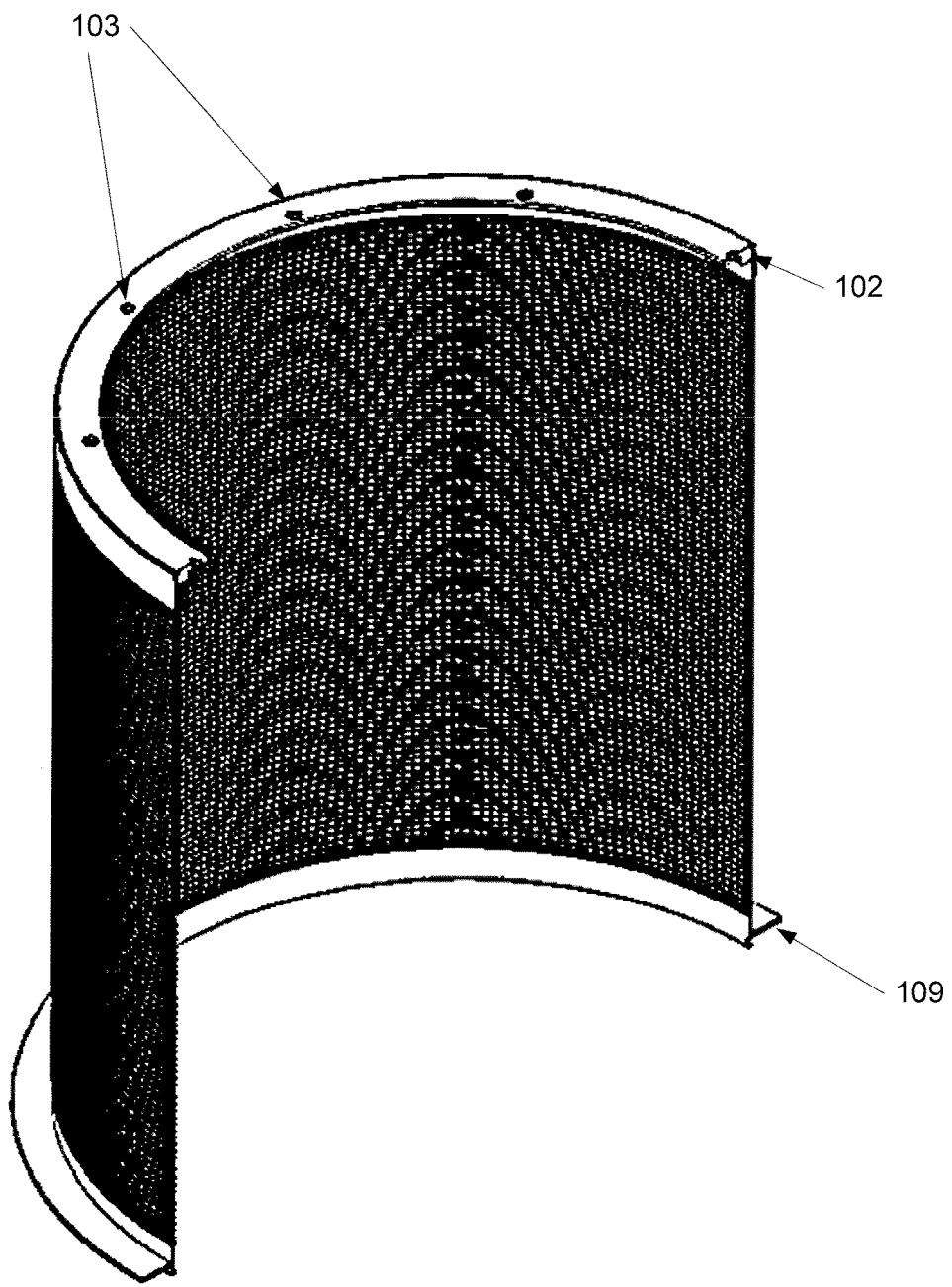
FIG. 3 is a longitudinal and cross-sectional view of a drum according to one embodiment of the present invention.
Figure 7:
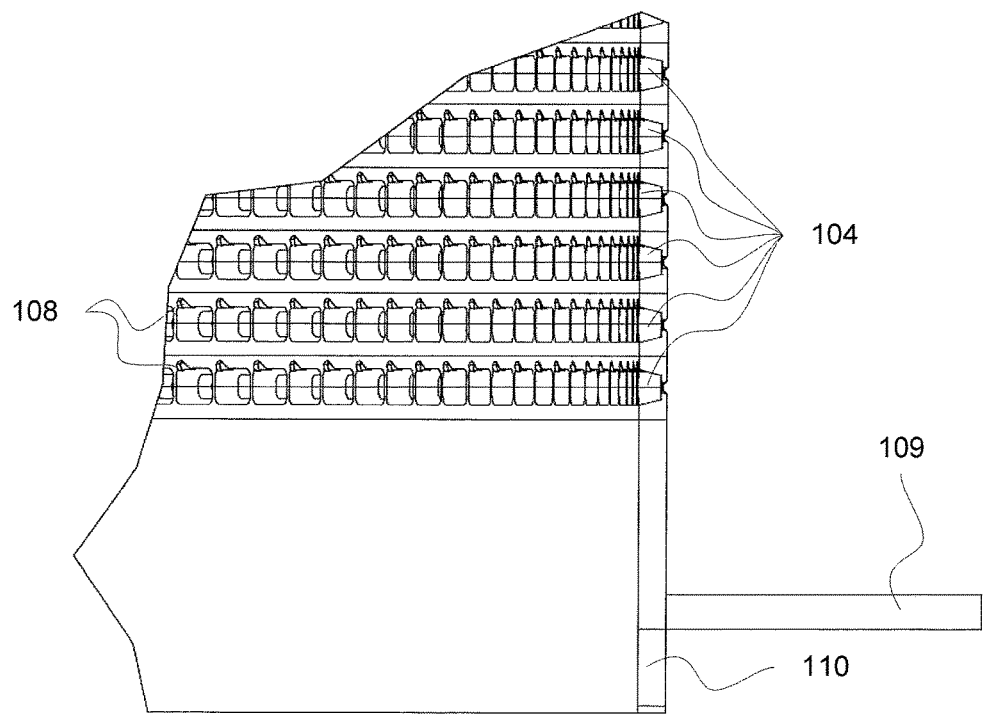
FIG. 7 is a close up of a cross sectional view of the first axial end of a drum, according to one embodiment of the present invention.

At the outer peripheral cylindrical surface of the body 101, a stabilizing flange 109 is arranged, in accordance with FIGS. 3 and 7. It is also possible to arrange more than one stabilizing flange 109 on the outer or inner peripheral cylindrical surface of the body 101. This stabilizing flange 109 allows for a facilitated manufacturing of the drum 100, as well as assisting in maintaining the shape of the drum 100 during use and wear, which will be further elucidated below. Additionally, the stabilizing flange 109 may screen a count mark 110, arranged closer to the first axial end of the body 101 than the stabilizing flange 109, from light distributed peripherally of the drum 100 during illumination of objects in the pockets 104 on the inner envelope surface of the body 101. The count mark 110 may in turn be used for counting drum rotations/revolutions, whereby relative distance between counter mark and pockets 104 are used for establishing pocket identity during illumination and sorting. The count mark 110 may be a hole, long-hole or a cut-out at the end zone of the first axial end of the drum 100, such as at the first axial end. Rotations/revolutions may be counted by having an illumination source in the lumen or outside the drum 100, and a illumination detector on the opposite side of the source. In this way, each signal to the detector will resemble to completion of one rotation/revolution, where after relative position between pockets 104, detectors and object illumination sources may be reset. It is also possible to have more than one count mark 110, such as one count mark 110 per pocket row of the drum 100. The latter may be used if there is a need to identify the position of each row of pockets 104, such as if there has not been established a correlation between a single count mark 110 and each row of pockets 104. The stabilizing flange 109 extends radially outwards from end zone at the first axial end of the drum 100.

The drum 100 is manufactured by milling the pockets 103 and the grooves with a cutter and/or drill. A plate of metal, for example having a thickness of 2 to 15 mm, such as 3 to 10 mm, is put into the cutter. The plate has dimensions and shape corresponding to the envelope surface of the drum 100. The plate may be fixed and positioned in the cutter by drilling reference holes in the plate, which holes will match guide pins on the milling table. The outer envelope surface is milled to form the grooves 106. Thereafter the plate is flipped over and the inner envelope surface is milled to form the pockets 104. Due to the interaction between the guide pins on the milling table and the reference holes in the plate, the position of the grooves 106 are known to the cutter, such that the pockets 104 may be milled on positions on the inner envelope surface corresponding to the position of the grooves 106 on the outer envelope surface.

Prior to milling the pockets 104 into their final shape, the pockets 104 may be pre-drilled into durum pockets, comprising a number, such as 3, cylindrical cavities, having a width and length somewhat underpassing the intended final dimensions of the pockets 104. This is done to make sure that the milling into the final shape will erase the pre-drilled durum pockets. The diameter of each cylindrical cavity may be from 1.5 to 20 mm, such as 2 to 5 mm. The width, depth and length of the durum pockets may underpass the dimensions of subsequent milling of the pockets with from 0.1 to 1 mm, such as from 0.2 to 0.4 mm. When the pockets 104 are provided with ears 108, the ears 108 are also milled in an underpassing way in the same relation to subsequent milling.

After the pre-drilling of the pockets 104, the pockets 104 may be coarse milled. The course milling is preferably done to dimensions underpassing the intended final dimensions of the pockets 104 with 0.1 to 1 mm, such as 0.3 to 0.7 mm.

During or subsequent to the coarse milling, the pockets 103 are milled such that a part thereof break through into the grooves 105, thereby forming the openings 105. Preferably, the openings 105 are coarse milled into dimensions underpassing the intended final dimensions with from 0.05 to 0.2 mm, such as 0.1 mm.

After coarse milling, the pockets 104 and openings 105 are fine milled. The fine milling of the pockets 104 and the openings 105 are preferably done with a cutter bit with a conical shape. In this way, a slanting and sharp edge between the pockets 104 and the grooves 106 may be obtained, which will facilitate removal of objects getting stuck in the pockets 104.

In some instances it is preferred to have a sharp, such as straight, back edge of the pockets 104. This may for example be called for when the drum 100 should be used to separate barley, since the barley grains otherwise tend to slip out of the pockets 104. This may for example be obtained with a cylindrical cutter bit, such as a cylindrical cutter bit with a diameter of 2 to 4 mm.

If there is a need for fine tuning the openings 105, such as trimming the edges of the openings 105 or adapting final shape and dimensions of the openings 105, this may be performed after the fine milling. In such instances the fine tuning of the openings 105 may be performed with a 90 degrees shank end mill.

Here after, the hole, long-hole or cut-out of the count mark 110 is formed, through the use of a suitable drill or cutter bit. If more than one count mark 110 is wished for, due to the circumstances mentioned above, these additional count marks may be formed in the same step.

The plate is rolled into its cylindrical shape by the aid of rollers, and welded into its cylindrical shape.

Thereafter, the plate is cut to a length corresponding to the intended axial distance from the first to the second axial end. When cutting the plate to a suitable length, guide holes may be drilled along the intended cutting line. An angle grinder may then be used to cut along the line formed by the guiding holes, where after the cut end surface is ground until the hole marks from the guiding holes have been erased.

The stabilizing flange 109 is then heated through induction or other heat supply, such as a burning flame, to expand the stabilizing flange 109 such that it may be placed around the cylindrical body 101. After heating the stabilizing flange 109 is thus placed on the cylindrical body 101. After and during cooling, the cooling stabilizing flange 109 is shrunk onto the cylindrical body, to erase small radial deviations from the rolling step.

Although the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A drum for sorting objects, said drum having a cylindrical shape, and said drum comprising:
   a cylindrical body, with an inner and an outer envelope surface;
   a plurality of pockets arranged in columns, each column extending on the inner envelope surface of the cylinder body and extending transversally to the central and longitudinal axis of the drum, each of said pockets having a bottom provided with an opening that opens up into the outer envelope surface; and
   a plurality of grooves, arranged on the outer envelope surface of the cylinder body and extending transversally to the central and longitudinal axis of the drum, wherein each groove of the plurality of grooves interconnects a plurality of the openings that opens up into the outer envelope surface of a respective column comprising the plurality of pockets arranged on the inner envelope surface of the cylindrical body.

2. The drum according to claim 1, further comprising a suspension flange, extending centrally from the second axial end of the body.

3. The drum according to claim 2, wherein the suspension flange is provided with apertures for receiving bolts there through in a drum suspending manner.

4. The drum according to claim 3, wherein the edge of the apertures at the second end surface of the suspension flange are slanting laterally in relation to the central axis of the aperture towards the second end surface of the suspension flange.

5. The drum according to claim 1, wherein at least one groove of the plurality of grooves has a slanting side surface, slanting laterally and upwardly in relation to the at least one groove of the plurality of grooves.

6. The drum according to claim 1, comprising a count mark at the end zone of the first axial end of the body.

7. The drum according to claim 1, further comprising at least one stabilizing flange extending radially outwards from end zone at the first axial end of the body.

8. The drum according to claim 7, wherein the count mark is arranged closer to the first axial end of the body than the at least one stabilizing flange.

9. A machine for sorting objects, comprising:
the drum according to claim 1;
a support structure on which the drum is arranged in the machine in a supporting manner; and
a driving means connected to the drum to rotate the drum around its central and longitudinal axis.

10. A method for manufacturing the drum according to claim 1, said method comprising the steps of:
cutting and/or drilling the plurality of grooves;
cutting and/or drilling the plurality of pockets each pocket comprising a bottom;
cutting and/or drilling the opening in the bottom of each pocket;
rolling the plate into the cylindrical body;
connecting ends of said plate against each other in a shape of said cylindrical body.

11. The method according to claim 10, further comprising
heating a stabilizing flange in the form of a ring, to expand said ring; arranging said stabilizing flange on said cylindrical body in an arranged state; and
cooling said stabilizing flange in said arranged state, such that the stabilizing flange is shrunk onto the cylindrical body.

* * * * *